UNITED STATES PATENT OFFICE.

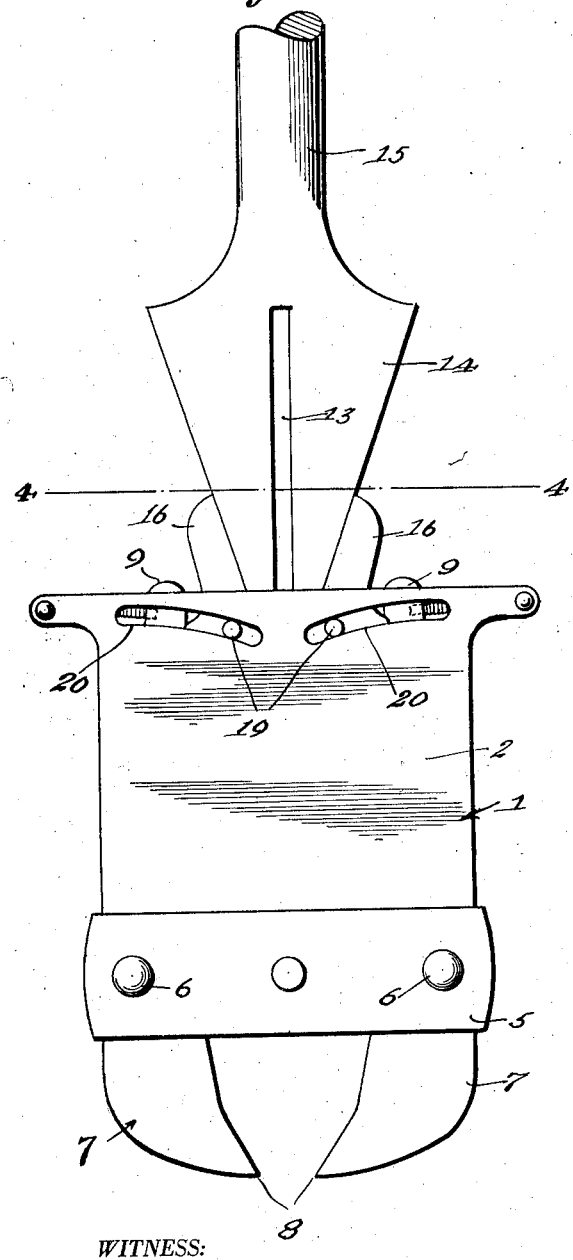
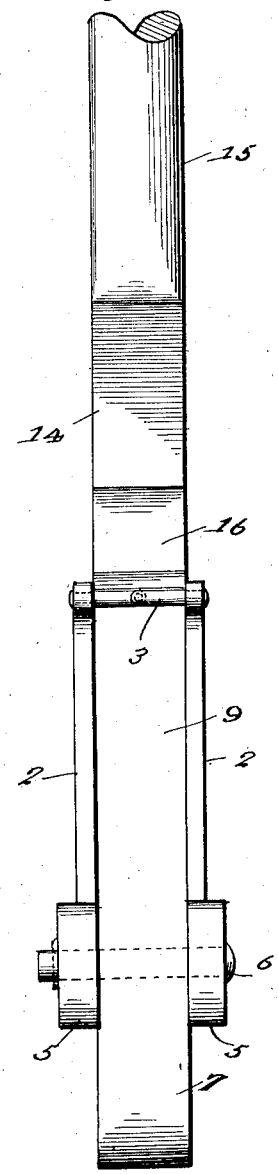

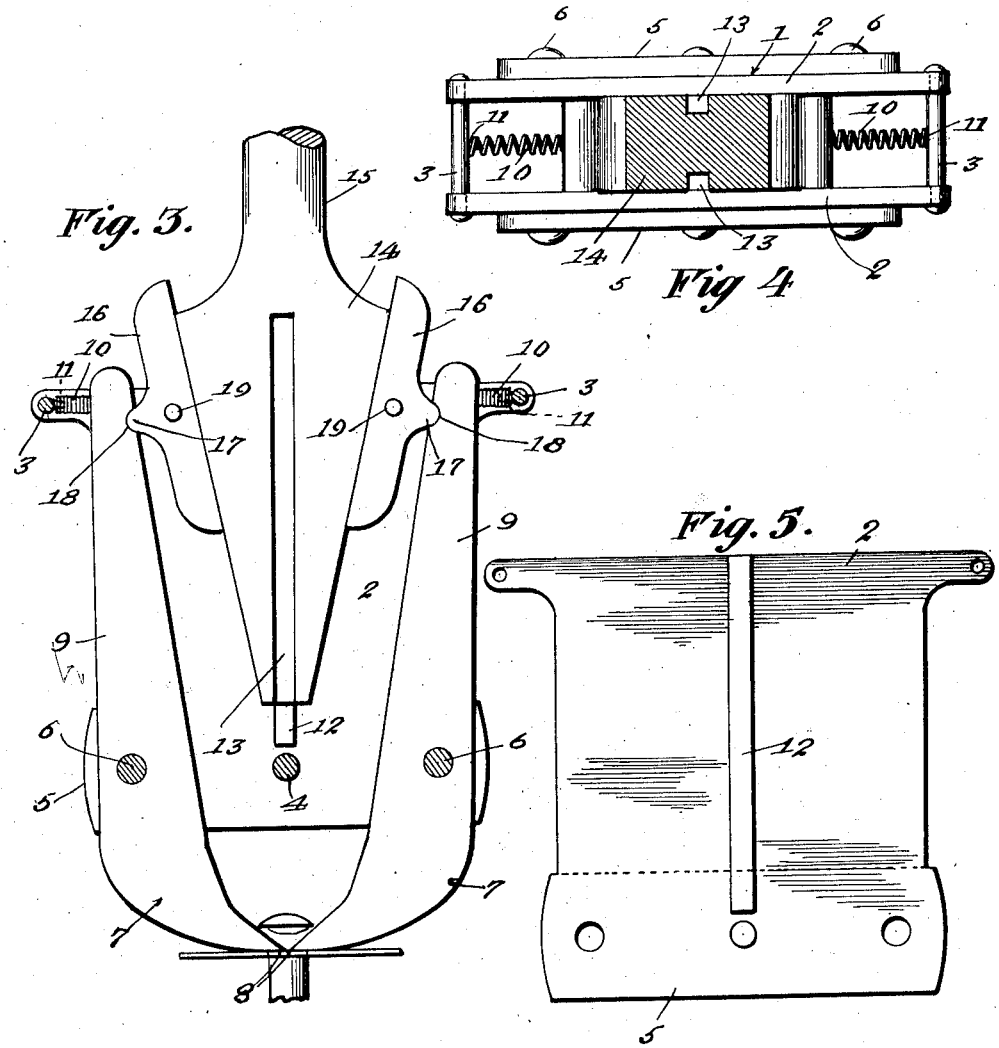

IRA W. BARNES, OF EAST LIVERPOOL, OHIO.

RIVET-CUTTER.

1,350,206.  Specification of Letters Patent.  Patented Aug. 17, 1920.

Application filed October 10, 1919. Serial No. 329,655.

*To all whom it may concern:*

Be it known that I, IRA W. BARNES, a citizen of the United States, residing at East Liverpool, in the county of Columbiana and State of Ohio, have invented new and useful Improvements in Rivet-Cutters, of which the following is a specification.

This invention relates to cutting tools, and more particularly to a tool specially adapted to remove the heads from rivets, and for similar purposes.

One of the main objects of the invention is to provide a tool of the character stated which is specially adapted for use in connection with the ordinary pneumatic tool or air gun. A further object is to provide a tool having rockable cutting jaws and means for applying relatively great power to these jaws for forcing them toward each other. Another object is to provide jaw operating means by which a great leverage effect is obtained at all times during the operation of these jaws. Further objects will appear from the detailed description.

In the drawings:—

Figure 1 is a front view of a rivet cutter constructed in accordance with my invention.

Fig. 2 is a side view of the same.

Fig. 3 is a front view of the cutter with the front plate removed, the wedge being shown in its inner position.

Fig. 4 is a section taken substantially on line 4—4 of Fig. 1.

Fig. 5 is a detail inside view of one of the plates of the casing.

In constructing the cutter I provide a substantial rectangular or box like casing 1 which is formed of two similar plates 2 secured in parallel spaced relation by corner spacing posts 3 and a lower central spacing post 4. Each of these plates is provided at its lower end with a thickened reinforcing element 5 through which passes, adjacent each end thereof, a heavy pivot pin 6 upon which is rockably mounted a cutting jaw designated generally by 7. The two jaws 7 are opposed and are provided at their lower ends with cutting edges 8, the lower end portions of these jaws being of arcuate shape and tapering to readily engage beneath the head of a rivet as indicated in Fig. 3. Each of the jaws is provided with a relatively long upwardly extending shank 9 between the upper end of which and the corner spacing post 3, an expansion coil spring 10 is confined, the outer end portion of this spring fitting about a stud 11 (Fig. 4) projecting from post 3. These springs act to force the upper ends of shanks 9 toward each other thus normally holding the cutting elements of the jaws apart.

Each of the plates 2 is provided with an inwardly projecting longitudinally extending central rib 12, these ribs fitting into corresponding grooves 13 provided in the opposite sides of a wedge member 14 slidable between the plates and provided with a shank 15 adapted to be inserted into a pneumatic gun or tool in the well known manner so as to be reciprocated thereby. Wedge 14 is operable between two rockers or blocks 16 each provided at the central portion of its outer face with a rounded lug 17 fitting loosely into an arcuate recess 18 provided in the inner face of shank 9. The block or rocker is further provided with front and back studs 19 which may be formed either integral therewith or by driving a pin through the rocker, these studs projecting through slots 20 provided through plates 2, these slots being concentric with the pivot pin 6. As will be noted more clearly from Figs. 1 and 3, the inner faces of the rockers 16 fit snugly against the sides of wedge 14 so that the pressure of this wedge is at all times transmitted to the shanks 9 of jaws 7 at the upper ends thereof by means of lugs 17. This enables a great leverage effect to be obtained for forcing the cutting jaws 7 toward each other, and this leverage effect is greatly augmented by the great lateral or outward pressure obtained by using the wedge 14. As is clearly shown in Fig. 3 of the drawings, the inner faces of the rockers or blocks 16, as well as the lateral faces of the wedge, are flat or plane, and the inner faces of the blocks are of comparatively great length and area relative to the lateral faces of the wedge so as to grip the wedge frictionally and effectually prevent rebound of the wedge when it is forced inwardly between the blocks.

In use, the shank 15 of wedge 14 is inserted into a pneumatic tool, the cutter being then placed into position so that the jaws 7 are positioned adjacent to and diametrically of the rivet head, after which compressed air is admitted to the air gun thus reciprocating the wedge. The combined wedge and lever construction employed serves to exert sufficient pressure upon the upper ends of shanks 9 to force the jaws 7 toward each other with sufficient power to readily cut off or sever the head of a rivet, as indicated in Fig. 3. This device may be readily applied or used in connection with an air tool or gun of standard type without necessitating any changes whatever in structure of the tool, and for this reason, is deemed very practical for the purposes intended.

What I claim is:

1. In a rivet cutter, rockably mounted cutting members having upwardly extending shanks, blocks engaging said shanks adjacent the upper ends thereof, and a wedge reciprocable between said blocks for forcing the same apart, the wedge having plane lateral faces and the inner faces of the blocks being plane, said blocks being mounted for movement with the shanks and being also mounted so as to permit movement of their inner faces into parallelism with the lateral faces of the wedge so as to contact therewith throughout their full length.

2. In a rivet cutter, rockably mounted cutting members having upwardly extending relatively long shanks, blocks rockably engaging said shanks adjacent the upper ends thereof, and a wedge reciprocable between said blocks for forcing the blocks apart, said wedge and the blocks having contacting plane surfaces.

3. In a rivet cutter, rockably mounted cutting members each having an upwardly extending relatively long shank, blocks rockably engaging said shanks adjacent the upper ends thereof, and a wedge member reciprocable between said blocks for forcing the same away from each other, said wedge and the blocks have plane contacting surfaces and the contacting surfaces of the blocks being of great area relative to the contacting surfaces of the wedge for frictionally gripping the wedge so as to prevent rebound thereof.

4. In a rivet cutter, a casing, two cutting members rockably mounted in the casing and provided with upwardly extending shanks, blocks rockably engaging said shanks adjacent the upper ends thereof, the inner faces of the blocks being flat, means for supporting said blocks for movement toward and away from each other through arcs concentric with the axes of movement of said cutting members, and means for normally forcing the shanks toward each other, said casing being adapted to slidably receive and guide a wedge member for reciprocation centrally of the casing and between the blocks.

5. In a rivet cutter, a casing, two cutting members rockably mounted in the casing and provided with upwardly extending shanks, blocks rockably engaging said shanks adjacent the upper ends thereof, said casing being adapted to slidably receive and guide a wedge for operation between the blocks for forcing the same apart, and a wedge operable between the blocks, the inner faces of the blocks being plane and of comparatively great area.

6. In a rivet cutter, two plates mounted in parallel spaced relation, opposed cutters rockably mounted between said plates and each having an upwardly extending relatively long shank, each of the plates being provided with a central longitudinally extending and inwardly projecting rib, blocks rockably engaging said shanks adjacent the upper ends thereof, said blocks being provided with outwardly projecting studs and the plates being provided with arcuate slots concentric with the axes of movement of the cutting members and receiving said studs for supporting and guiding the blocks during operation thereof, and a wedge member slidable between said blocks provided in its opposite sides with longitudinally extending grooves receiving said ribs, the lateral faces of the wedge member engaging the inner faces of said blocks for forcing the same apart when the wedge member is forced inwardly between said plates.

In testimony whereof I affix my signature.

IRA W. BARNES.